(12) United States Patent
Dong

(10) Patent No.: US 7,855,769 B2
(45) Date of Patent: Dec. 21, 2010

(54) LIQUID CRYSTAL DISPLAY PANEL HAVING PARTICULAR SUB-PIXELS

(75) Inventor: Xue Dong, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 439 days.

(21) Appl. No.: 12/058,948

(22) Filed: Mar. 31, 2008

(65) Prior Publication Data

US 2008/0259256 A1 Oct. 23, 2008

(30) Foreign Application Priority Data

Apr. 17, 2007 (CN) .................... 2007 1 0065592

(51) Int. Cl.
*G02F 1/1337* (2006.01)
*G02F 1/1343* (2006.01)
*G02F 1/1335* (2006.01)

(52) U.S. Cl. .................. 349/129; 349/144; 349/146; 349/123; 349/106

(58) Field of Classification Search .............. 349/129, 349/144, 146, 123, 106
See application file for complete search history.

(56) References Cited

U.S. PATENT DOCUMENTS 6,781,655 B2 * 8/2004 Yamazaki et al. ........... 349/123

FOREIGN PATENT DOCUMENTS

| CN | 1794072 A | 6/2006 |
|---|---|---|
| JP | 10-274777 | 10/1998 |
| JP | 2008268944 A * | 11/2008 |
| KR | 2004-0098728 | 11/2004 |
| KR | 2006-0046650 | 5/2006 |

* cited by examiner

*Primary Examiner*—Mike Qi
(74) *Attorney, Agent, or Firm*—Sheridan Ross P.C.

(57) ABSTRACT

A liquid crystal display (LCD) panel is provided, which comprises a plurality of array units. Each array unit comprises a first pixel and a second pixel which are equal in number; sub-pixels in the first pixel and the second pixel have respective single domain inclination directions; and the domain inclination directions of the sub-pixels in the first pixel are different from those of the corresponding sub-pixels in the second pixel. A better effect on color bias and viewing angle can be achieved with the LCD panel of the present invention.

11 Claims, 5 Drawing Sheets

LIQUID CRYSTAL DISPLAY PANEL HAVING PARTICULAR SUB-PIXELS

FIELD OF THE INVENTION

The present invention relates to a liquid crystal display panel.

BACKGROUND OF THE INVENTION

In a conventional liquid crystal display (LCD) panel, a fringe field switching (FFS) technology has been generally employed to widen the viewing angle of the LCD panel. The FFS technology provides the LCD panel with a wide viewing angle, in which technology both a common electrode and a pixel electrode are formed on an array substrate and a fringe electric field formed between the electrodes is used to drive the liquid crystal. Such FFS LCD panel has the advantages of a wide viewing angle, less color bias, lower power consumption, etc. In addition, in order to further enhance display performance, the conventional FFS technology may also employ a multi-domain design in a single pixel.

FIGS. 1 and 2 are schematic views of a single domain sub-pixel array unit and a double domain sub-pixel array unit based on the FFS technology, respectively. The whole display area of the LCD panel is formed by combining a plurality of pixels of the same configuration. Specifically, the direction of the oblique lines in the figures represents the inclination direction of the corresponding pixel electrodes. Each pixel comprises three sub-pixels, i.e., red, green, and blue sub-pixels. In FIG. 1, a red sub-pixel 11, a green sub-pixel 12, and a blue sub-pixel 13 in a pixel 10 are all single domain sub-pixels, i.e., the inclination directions of the pixel electrodes of each sub-pixel are identical with each other. In FIG. 2, a red sub-pixel 21, a green sub-pixel 22, and a blue sub-pixel 23 in a pixel 20 are all double domain sub-pixels, i.e., each sub-pixel has two inclination directions of the pixel electrodes. In FIG. 2, the upper portion of each sub-pixel employs a symmetry configuration with respect to the lower portion.

The defects of the conventional design lies in that the single domain sub-pixel shown in FIG. 1 has a larger color bias and a poorer viewing angle compared with the double domain sub-pixel shown in FIG. 2. The specific experimental data are shown in FIGS. 3-6, which illustrate comparison views of the color bias and the viewing angle for two types of pixel, respectively. It can be seen from the figures that the single domain sub-pixel generates larger color bias as the viewing angle changes, and the viewing angles in the horizontal and vertical directions have a relatively poor effect.

The double domain sub-pixel shown in FIG. 2 has a better color bias effect and a better viewing angle effect. However, in the boundary area between the upper portion and the lower portion of the pixel as shown with the black triangles in FIG. 2, the inclination directions of the pixel electrodes are opposite to each other, i.e., there are two different liquid crystal domains in the apertures area of a single pixel. Therefore, it is difficult for the electric field of the pixel electrodes to drive the LCD panel effectively, resulting in that the optical efficiency of the liquid crystal in the boundary area is extremely low and lowering the light transmissivity for the whole LCD panel. In addition, when the applied electrical filed is extremely large, the boundary area between the two domains may also expand into the normal display areas, which imposes a bigger influence on the display performance of the product.

In the conventional technology, in order to overcome the defect of the low light transmissivity of the above double domain sub-pixel, a normally used method is to enhance the power of a backlight source. However, it means a higher cost requirement and higher power consumption, but the effect is not satisfactory.

SUMMARY OF THE INVENTION

In view of the above problems of a large color bias and a poor viewing angle effect of the pixel array employing a single domain sub-pixel and low light transmissivity of the pixel array employing a double domain sub-pixel in the conventional FFS technique, the present invention is conducted.

One embodiment of the invention provides a liquid crystal display (LCD) panel which comprises a plurality of array units. Each array unit comprises a first pixel and a second pixel which are equal in number; sub-pixels in the first pixel and the second pixel have respective single domain inclination directions; and the domain inclination directions of the sub-pixels in the first pixel are different from those of the corresponding sub-pixels in the second pixel.

With the embodiment of the invention, since three kinds of sub-pixels in each pixel have their respective single domain inclination directions, the boundary area in the double domain sub-pixel as shown in FIG. 2 is absent and thereby a higher liquid crystal optical efficiency and a higher light transmissivity of the LCD panel can be achieved. In addition, since each array unit comprises pixels of two different domain inclination directions, i.e., the first pixels and the second pixels, this kind of pixel configuration can achieve a better effect on color bias and viewing angle compared with the LCD panel having the single domain sub-pixels throughout as shown in FIG. 1.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWING

The present invention will become more fully understood from the detailed description given hereinafter and the accompanying drawings which are given by way of illustration only, and thus are not limitative of the present invention and wherein.

DESCRIPTION OF THE PREFERRED EMBODIMENTS

The First Embodiment

Figure 7:
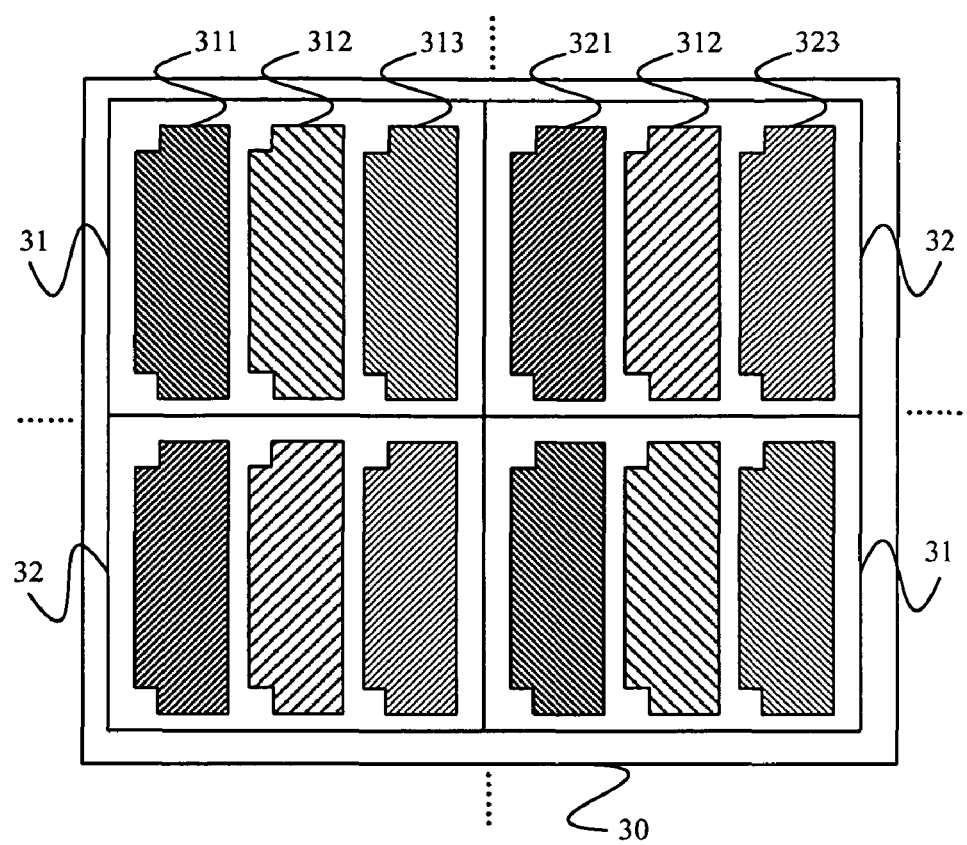
FIG. 7 is a schematic view of an array unit configuration in a first embodiment of the invention.

The present embodiment provides a liquid crystal display (LCD) panel, including a plurality of array units 30, which are identical with each other, as shown in FIG. 7.

Each array unit 30 comprises two kinds of pixels, a first pixel 31 and a second pixel 32, which are aligned diagonally in the array unit. All the sub-pixels in the first pixel 31 and those in the second pixel 32 have their respective single domain inclination directions, respectively, and the domain inclination direction of the sub-pixels in the first pixel 31 is different from that of the corresponding sub-pixels in the second pixel 32.

Specifically, the first pixel 31 has three sub-pixels, which comprise a red sub-pixel 311, a green sub-pixel 312, and a blue sub-pixel 313, respectively. The above three sub-pixels have their respective single domain inclination direction, e.g., inclining towards the upper right corner as shown by the oblique lines in the drawing. Correspondingly, the second pixel 32 has three sub-pixels, which comprise, respectively, a red sub-pixel 321, a green sub-pixel 322, and a blue sub-pixel 323. The above three sub-pixels also have their respective single domain inclination direction, but the inclination direction is different from that of the corresponding three sub-pixels in the first pixel 31, e.g., inclining towards the lower right corner as shown by the oblique lines in the drawing. It should be specially pointed out that the domain inclination direction of the sub-pixels in the first pixel are symmetric with that of the corresponding sub-pixels in the second pixel about the boundary therebetween, however, in practice it is not necessary for them to be symmetric with each other, as long as the inclination directions of them are different from each other. However, it is preferable for them to be symmetric, which is favorable to obtain a better display performance.

Figure 8:
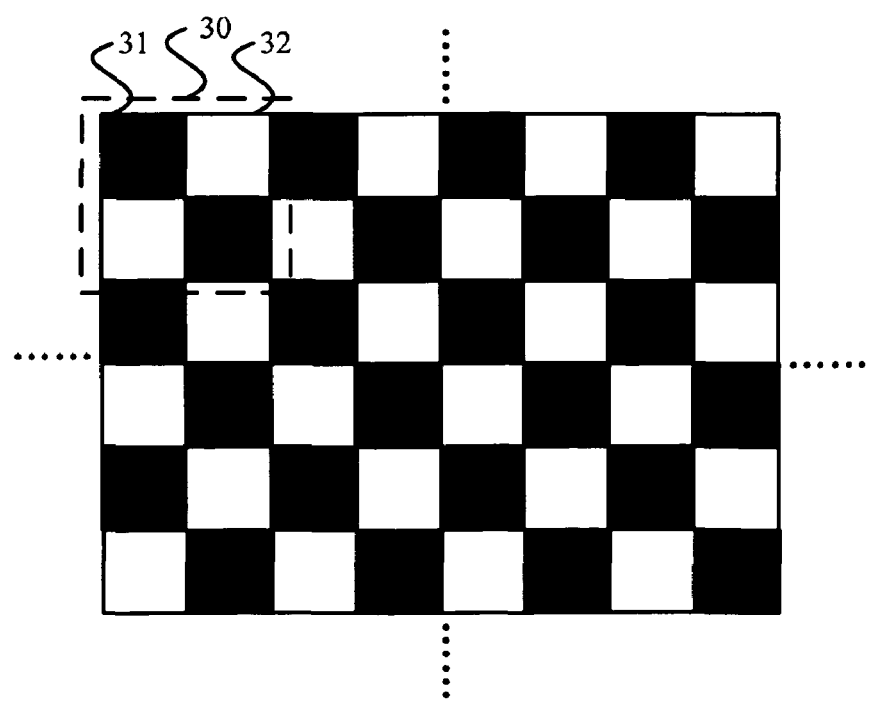
FIG. 8 is a schematic view of an array unit configuration in the first embodiment of the invention.

Two first pixels 31 and two second pixels 32 constitute collectively an array unit 30, and a plurality of array units 30 are aligned along horizontal and vertical directions repeatedly so as to form a LCD panel. FIG. 8 shows the LCD panel comprising the array units 30. In order to clearly show the alignment of the array units, a black block represents the position of the first pixel 31 in the array unit, and a white block represents the position of the second pixel 31 in the array unit 30.

Figure 9:
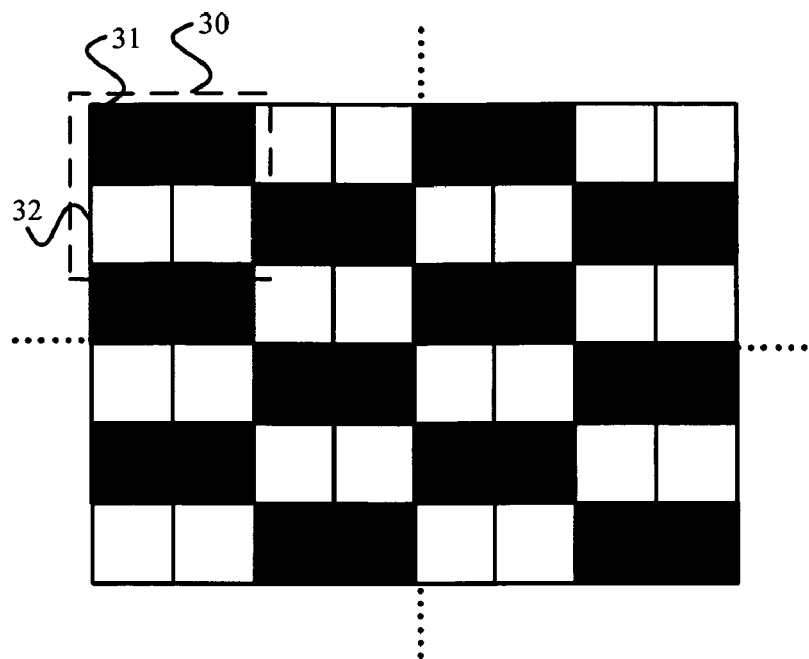
FIG. 9 is a schematic view of another array unit configuration in the first embodiment of the invention.
Figure 10:
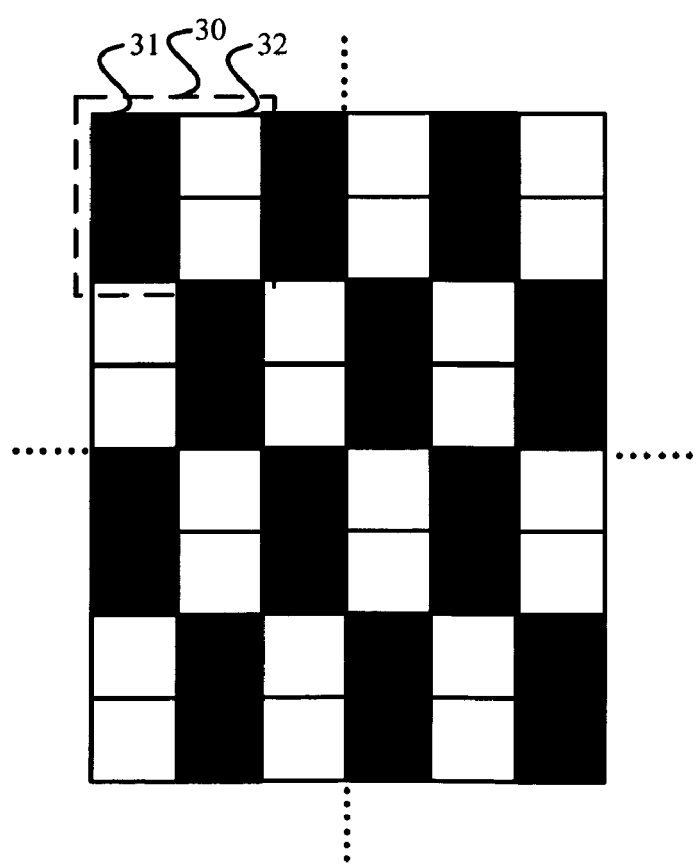
FIG. 10 is a schematic view of another array unit configuration in the first embodiment of the invention.

It should be pointed out that in each array unit 30, the first pixel 31 and the second pixel 32 may be aligned in other forms besides the form of being aligned diagonally. As shown in FIGS. 9 and 10, the first pixel 31 and the second pixel 32 may also employ an alignment form of being juxtaposed. In principle, in order to ensure the symmetrical characteristic of the LCD panel, it is needed for the same kind of pixels in the neighbor array units 30 in the LCD panel configuration not to be adjacent in either horizontal or vertical directions. For example, as shown in the FIGS. 8, 9 and 10, as for the second pixels 32 in the array unit 30, in the horizontal and vertical directions, they are only adjacent to the pixels of a different kind, i.e., the first pixels in the neighbor array unit, but not to the pixels of the same kind, i.e., the second pixels in the neighbor array unit.

In addition, the number of the pixels in each array unit 30 may be not only four, as long as it is satisfied that the number of the pixels in the array unit 30 is $4^n$, wherein "n" is a positive integer. Both numbers of the first pixels 31 and the second pixels 32 are a half of the total number, respectively, that is to say, the number of the first pixels 31 equals to that of the second pixels in each array unit 30. Specifically, the pixels in each array unit 30 may be aligned in such a way that all the pixels in each array unit 30 may be divided into four groups diagonally distributed on four corners of a square and the pixel(s) in each group is of the same kind. The two diagonally neighboring groups of pixels are of the same kind, and the two horizontal neighboring groups of pixels are of the different kind. Alternately, the two horizontal neighboring groups of pixels are of the same kind, and the two diagonally neighboring groups are of the different kind.

Figure 11:
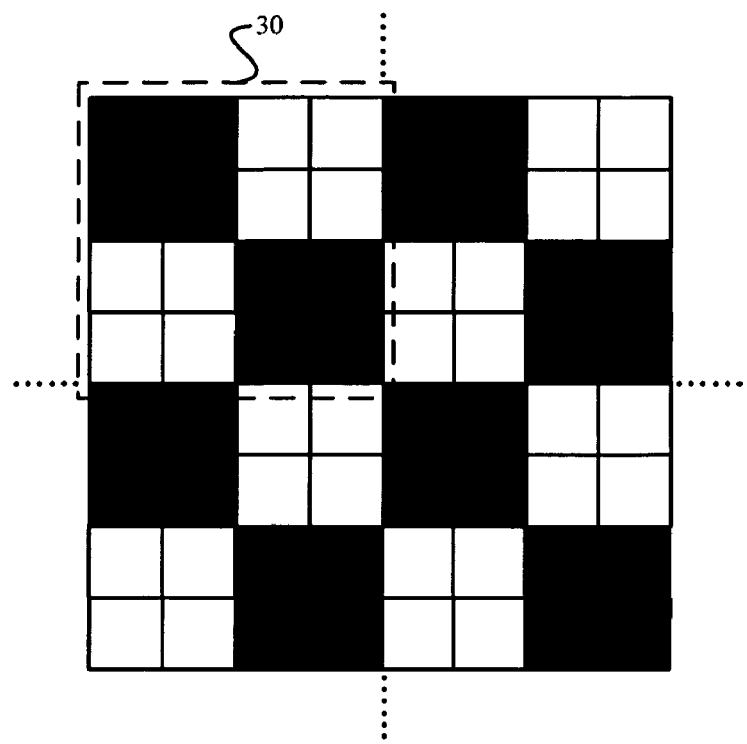
FIG. 11 is a schematic view of another array unit configuration in the first embodiment of the invention.
Figure 12:
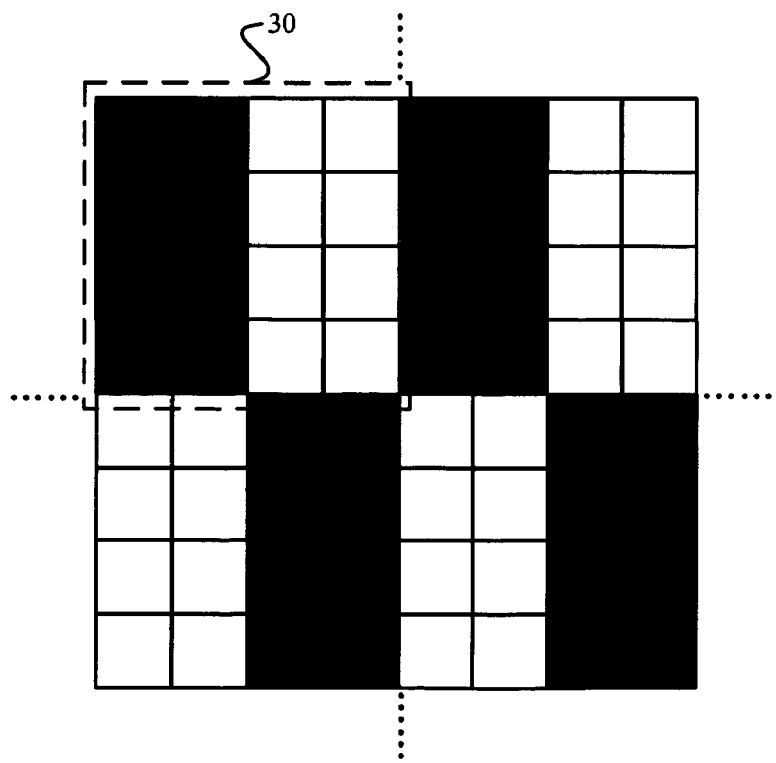
FIG. 12 is a schematic view of another array unit configuration in the first embodiment of the invention.

As shown in FIGS. 11 and 12, when n=2, there are 16 pixels totally in an array unit 30, of which eight pixels are first pixels 31 and other eight pixels are second pixels 32. The 16 pixels in the array unit 30 are divided into four groups distributed diagonally at four corners of a square, and each group has four pixels. Specifically, in FIG. 11, the two diagonally neighboring groups of pixels are of the same kind, and the two horizontally neighboring groups of pixels are of the different kind. In FIG. 12, the two horizontally neighboring groups of pixels in the array unit 30 are of the same kind, and the two diagonally neighboring groups are of the different kind.

Figure 1:
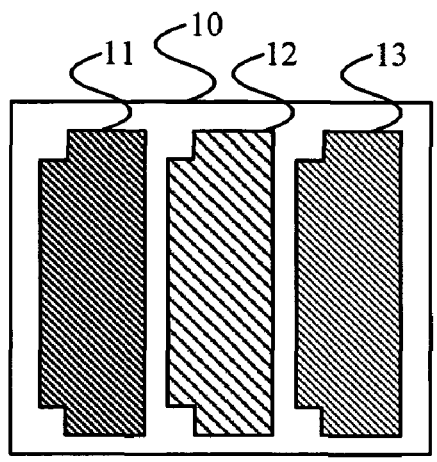
FIG. 1 is a schematic view of a single domain sub-pixel of a conventional liquid crystal display (LCD) panel.
Figure 2:
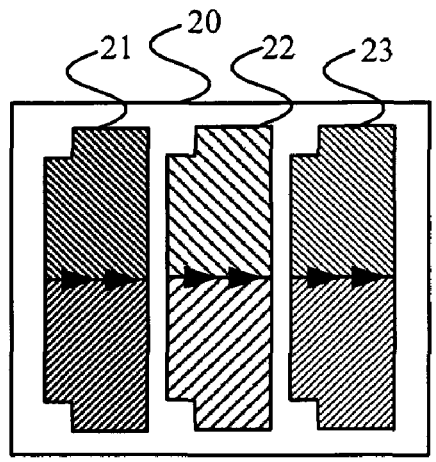
FIG. 2 is a schematic view of a double domain sub-pixel of a conventional LCD panel.
Figure 3:
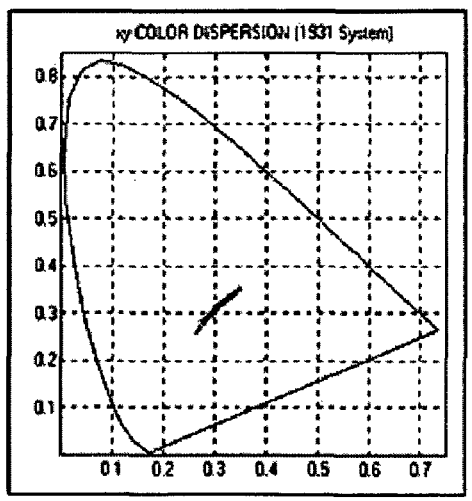
FIG. 3 is a comparison view of the color bias effect of the single domain sub-pixel of the conventional LCD panel.
Figure 4:
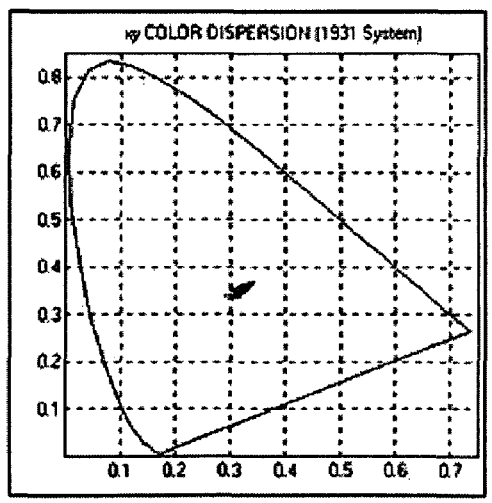
FIG. 4 is a comparison view of the color bias effect of the double domain sub-pixel of the conventional LCD panel.
Figure 5:
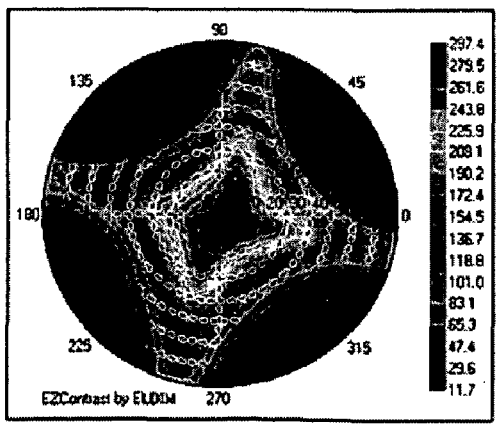
FIG. 5 is a comparison view of the viewing angle effect of the single domain sub-pixel of the conventional LCD panel.
Figure 6:
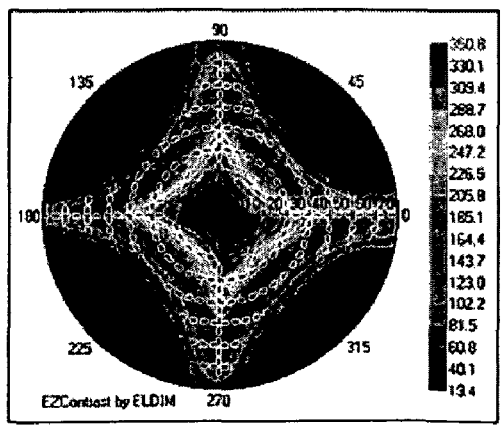
FIG. 6 is a comparison view of the viewing angle effect of the double domain sub-pixel of the conventional LCD panel.

In the LCD panel described in the above embodiment, since three kinds of sub-pixels in each pixel each have their respective single domain inclination direction, the boundary area in the double domain sub-pixel as shown in FIG. 2 is not present. Therefore, a higher liquid crystal optical efficiency and a higher light transmissivity of the LCD panel can be achieved. In addition, since each array unit comprises pixels of two different domain inclination directions, i.e., the first pixels and the second pixels, and this kind of pixel configuration can achieve better effect on color bias and viewing angle compared with the LCD panel having single domain sub-pixels throughout as shown in FIG. 1.

The Second Embodiment

Figure 13:
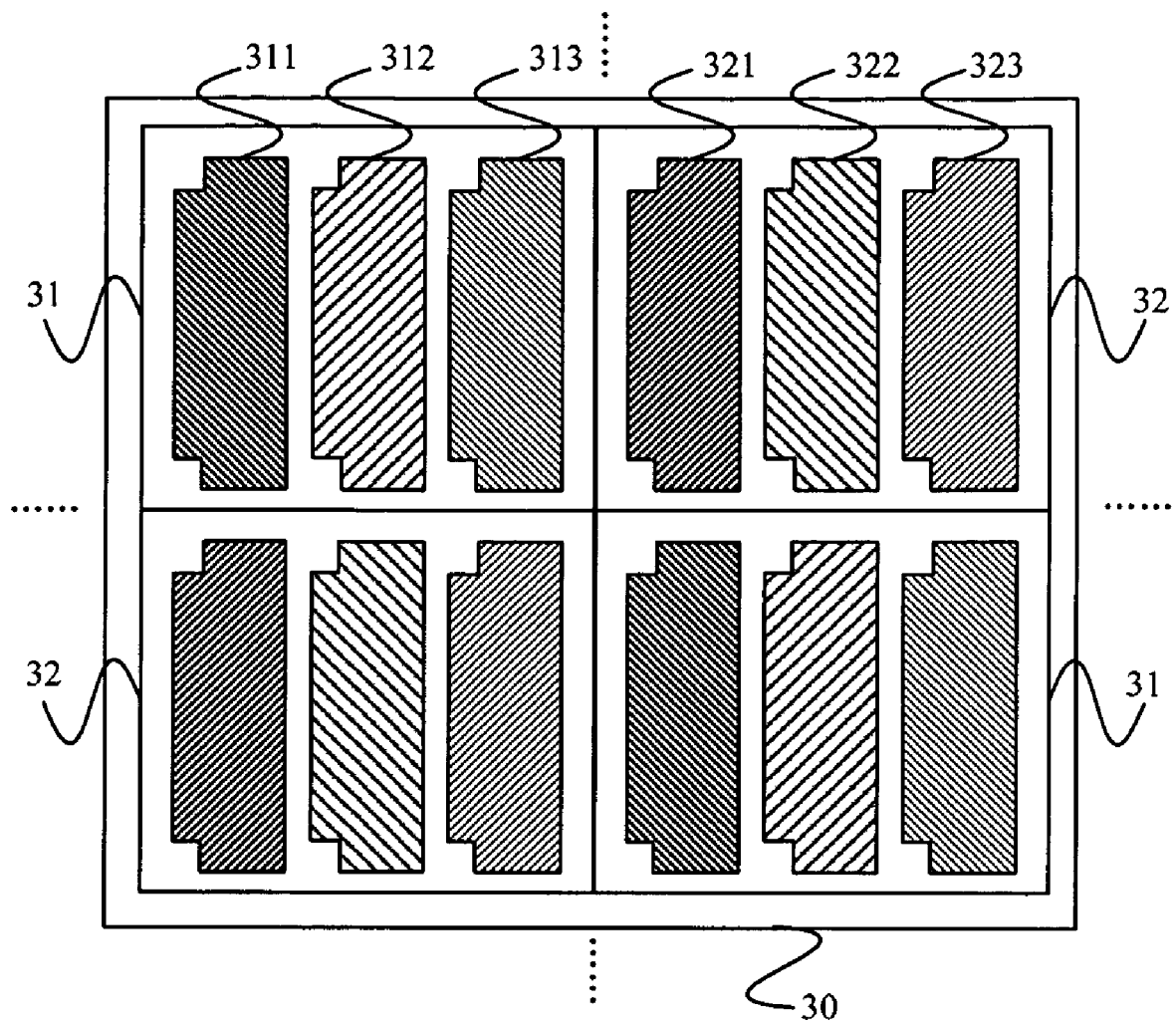
FIG. 13 is a schematic view of an array unit configuration in a second embodiment of the invention.

The second embodiment provides another LCD panel, as shown in FIG. 13.

The array unit 30 in FIG. 7 in the first embodiment comprises two kinds of pixels, i.e., the first pixels 31 and the second pixels 32, which are diagonally distributed. All the sub-pixels in the first pixels 31 and those in the second pixels 32 have their respective single domain inclination directions, and the domain inclination direction in the first pixels 31 is different from that of the corresponding sub-pixels in the second pixels 32. However, different from the array unit 30 shown in FIG. 7, the domain inclination direction of one sub-pixel in a pixel is different from those of the other two sub-pixels in the pixel.

For example, as shown in FIG. 13, the first pixel 31 has three kinds of sub-pixels, which comprise a red sub-pixel 311, a green sub-pixel 312, and a blue sub-pixel 313. The above three kinds of sub-pixels have their respective single domain inclination directions, in which the domain inclination direction of the green sub-pixel 312 is in the upper right direction as shown by the direction of the oblique lines in the drawing, and such direction is different from those of the red sub-pixel 311 and the blue sub-pixel 313. Correspondingly, the second pixel 32 has three kinds of sub-pixels, which comprise a red sub-pixel 321, a green sub-pixel 322, and a blue sub-pixel 323. The above three kinds of sub-pixels also have their respective single domain inclination directions, in which the domain inclination direction of the green sub-pixel 322 is different from those of the red sub-pixel 321 and the blue sub-pixel 323. It is ensured that the domain inclination directions in the second pixel 32 are different from those of the corresponding three kinds of sub-pixels in the first pixel 31.

It should be noted herein that in each pixel in the present embodiment, the domain inclination direction of the green sub-pixel is different from those of the other two sub-pixels. However, the domain inclination direction of the red sub-pixel may be different from those of the other two sub-pixels; alternately, the domain inclination direction of the blue sub-pixel may be different from those of the other two sub-pixels. Moreover, although the domain inclination directions of the sub-pixels in an individual pixel are symmetric as shown in FIG. 13, actually the symmetry is not necessary as long as the different inclination directions of them can be ensured. However, if the symmetric inclination directions are employed, it is favorable to obtain a better display performance.

Similarly, the first pixel 31 and the second pixel 32 in the embodiment constitute collectively an array unit 30, and they can be aligned in the way shown in FIGS. 8-12 and aligned along the horizontal and vertical directions repeatedly to form the LCD panel.

In the LCD panels described in the above embodiment, since the domain inclination direction of one sub-pixel in each pixel is different from those of the other two sub-pixels, there is present light compensation between the sub-pixels of different domain inclination directions and thereby the display performance can be further enhanced.

The invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A liquid crystal display (LCD) panel comprising a plurality of array units, wherein
   each array unit comprises a first pixel and a second pixel which are equal in number;
   sub-pixels in the first pixel and the second pixel have respective single domain inclination directions; and
   the domain inclination directions of the sub-pixels in the first pixel are different from those of the corresponding sub-pixels in the second pixel.

2. The LCD panel of claim 1, wherein
   the domain inclination directions of the sub-pixels of the first pixel are symmetric with those of the corresponding sub-pixels in the second pixel.

3. The LCD panel of claim 1, wherein
   pixels of the same kind in neighboring array units in the LCD panel are not adjacent to each other in either a horizontal direction and vertical directions.

4. The LCD panel of claim 1, wherein
   the number of the pixels in each array unit is $4^n$, wherein "n" is a positive integer.

5. The LCD panel of claim 4, wherein
   the pixels in the each array unit are divided into four groups distributing diagonally at four corners of a square, the pixel in each group being of a same kind.

6. The LCD panel of claim 5, wherein
   in each array unit, the two diagonally neighboring groups of pixels are of a same kind, and the two horizontally neighboring groups of pixels are of a different kind.

7. The LCD panel of claim 5, wherein
   in each array unit, two horizontally neighboring groups of pixels are of a same kind, and two diagonally neighboring groups of pixels are of a different kind.

8. The LCD panel of claim 1, wherein
   the sub-pixels in each pixels have a same domain inclination direction.

9. The LCD panel of claim 1, wherein
   the sub-pixels in each pixel have two different domain inclination directions.

10. The LCD panel of claim 9, wherein
    the each pixel has three kinds of sub-pixels, and wherein the domain inclination direction of one kind of sub-pixel is different from that of the other two kinds of sub-pixels.

11. The LCD panel of claim 10, wherein
    the three kinds of sub-pixels comprise a red sub-pixel, a green sub-pixel, and a blue sub-pixel.

* * * * *